US007997662B1

(12) United States Patent
Babineaux, Sr.

(10) Patent No.: US 7,997,662 B1
(45) Date of Patent: Aug. 16, 2011

(54) RIM SHIELD DEVICE

(76) Inventor: Joseph A. Babineaux, Sr., Baytown, TX (US)

( * ) Notice: Subject to any disclaimer, the term of this patent is extended or adjusted under 35 U.S.C. 154(b) by 0 days.

(21) Appl. No.: 12/855,607

(22) Filed: Aug. 12, 2010

(51) Int. Cl.
*B60B 7/10* (2006.01)

(52) U.S. Cl. ........... 301/37.103; 301/37.102; 301/37.31; 301/37.104; 118/505

(58) Field of Classification Search ............. 301/37.101, 301/37.102, 37.21, 37.31, 37.34, 37.35, 37.36, 301/37.103, 37.104, 108.1; 40/587; 118/505; 220/323
See application file for complete search history.

(56) References Cited

U.S. PATENT DOCUMENTS 1,766,366 A * 6/1930 Welch et al. .................... 292/30
2,627,839 A * 2/1953 Hudgins et al. ............... 118/505
2,768,851 A * 10/1956 Gifford ........................... 292/30
2,935,360 A * 5/1960 Lyon .......................... 301/37.38
4,784,440 A 11/1988 Fair
4,874,206 A 10/1989 Sampson
4,955,670 A * 9/1990 Koller ........................ 301/37.31
5,423,599 A 6/1995 Sherod et al.
5,524,972 A 6/1996 Cailor et al.
5,975,326 A * 11/1999 Monz ............................ 220/246
D418,102 S 12/1999 Schehr
6,059,376 A * 5/2000 Shryock ................... 301/37.109
D439,557 S 3/2001 Phillips et al.
6,685,276 B2 2/2004 Kenion
6,692,085 B1 2/2004 Threadgill
6,905,177 B1 6/2005 Murillo
7,448,694 B1 11/2008 Bentley
7,472,966 B2 * 1/2009 Goodman et al. ......... 301/37.25

FOREIGN PATENT DOCUMENTS

EP 430348 A1 * 6/1991

OTHER PUBLICATIONS

WWW.AUTOGEEK.COM; Wheel Shield; as of Dec. 31, 2009; internet.

* cited by examiner

*Primary Examiner* — Russell D Stormer

(57) ABSTRACT

A rim shield device for covering a rim of a tire featuring a circular base having a raised side along its outer edge; a plurality of channels disposed on the base extending radially from the center to the raised side; a cable disposed in each channel, the second end of each cable extends out of its respective channel; a hook disposed on the second end of each cable; and a tightening system comprising a spring-loaded button disposed in the center of the base, the first ends of each of the cables are engaged in the spring-loaded button, the spring-loaded button can move between an in position and an out position, an inner spring of the spring-loaded button biases the spring-loaded button in the out position, wherein in the out position the cables are effectively shortened in length and in the in position the cables are effectively lengthened.

2 Claims, 5 Drawing Sheets

RIM SHIELD DEVICE

FIELD OF THE INVENTION

The present invention is directed to a shield for rims of tires for helping to protect the rims from being sprayed with cleaning solutions as a user cleans the surrounding tires.

BACKGROUND OF THE INVENTION

When individuals clean the tires of their vehicle, they often spray the entire tire, including the rim, with the cleaning solution. This requires that the individual wipe and scrub the cleaning solution off of the rims, which can be time consuming. The present invention features a rim shield device for covering and protecting the rims of the tires while the tires are sprayed with cleaning solution. The rim shield device helps save users time when cleaning the tires of their vehicle.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
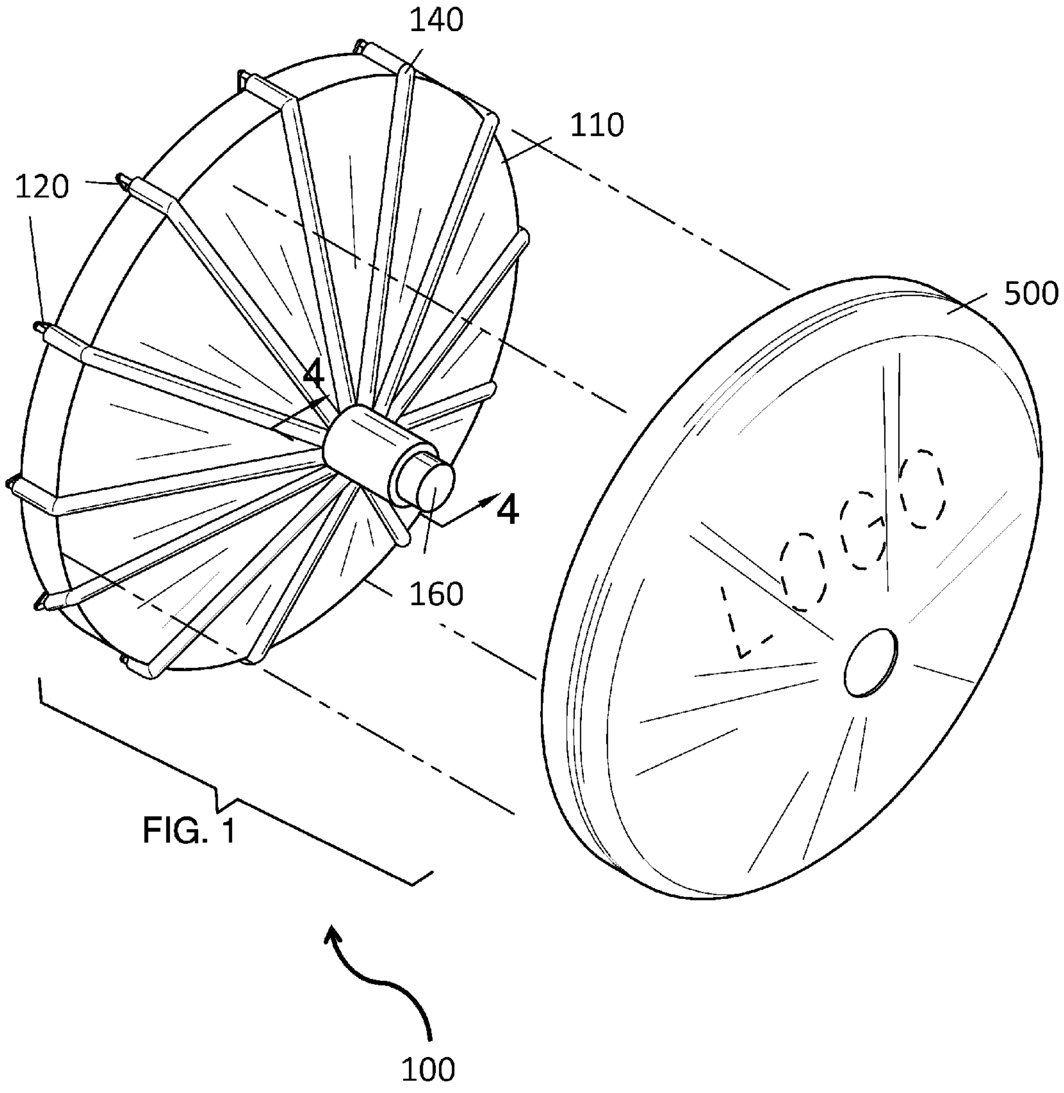
FIG. 1 is a front perspective view of the rim shield device of the present invention.
Figure 2:
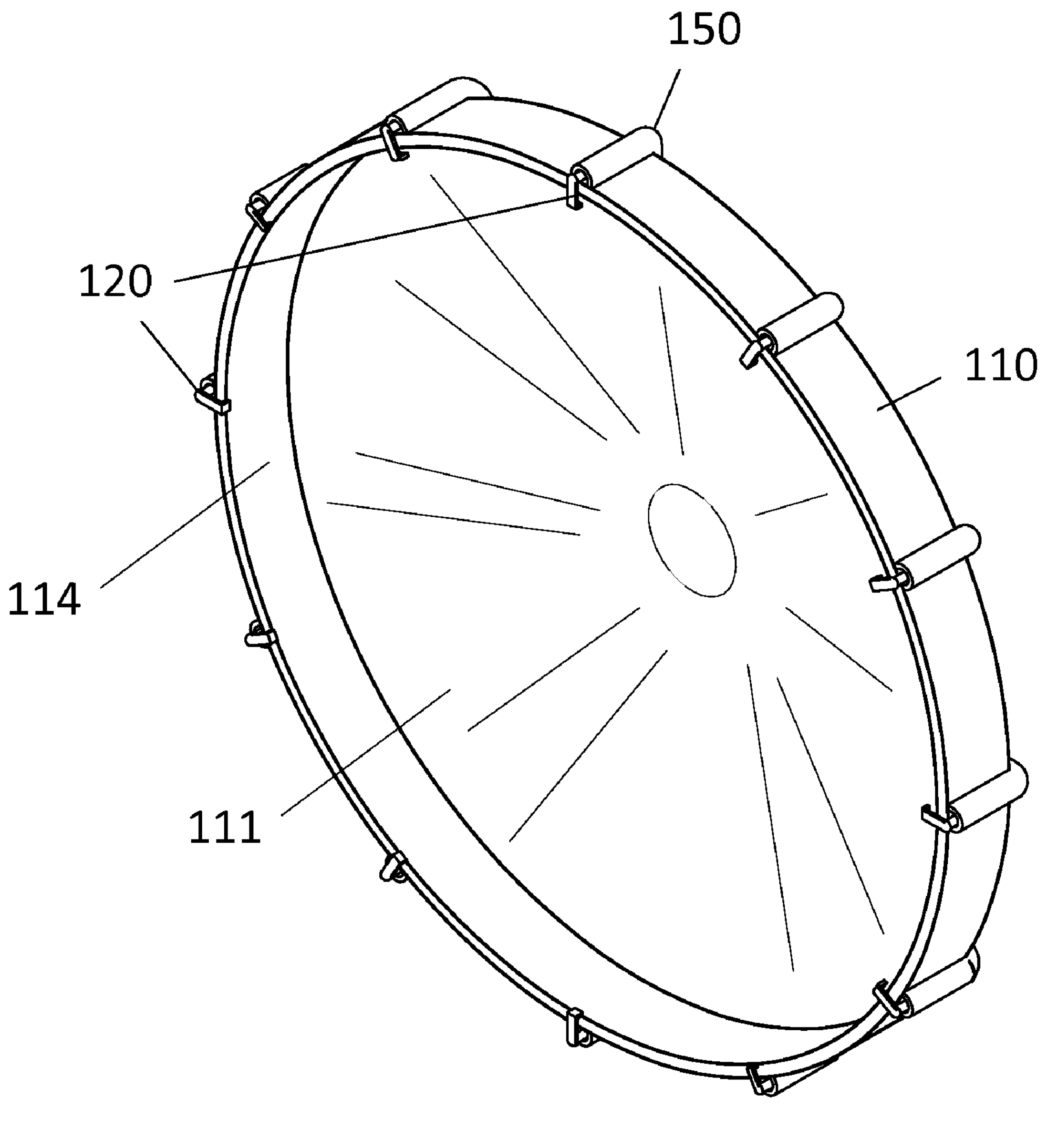
FIG. 2 is a back perspective view of the rim shield device of FIG. 1.
Figure 3:
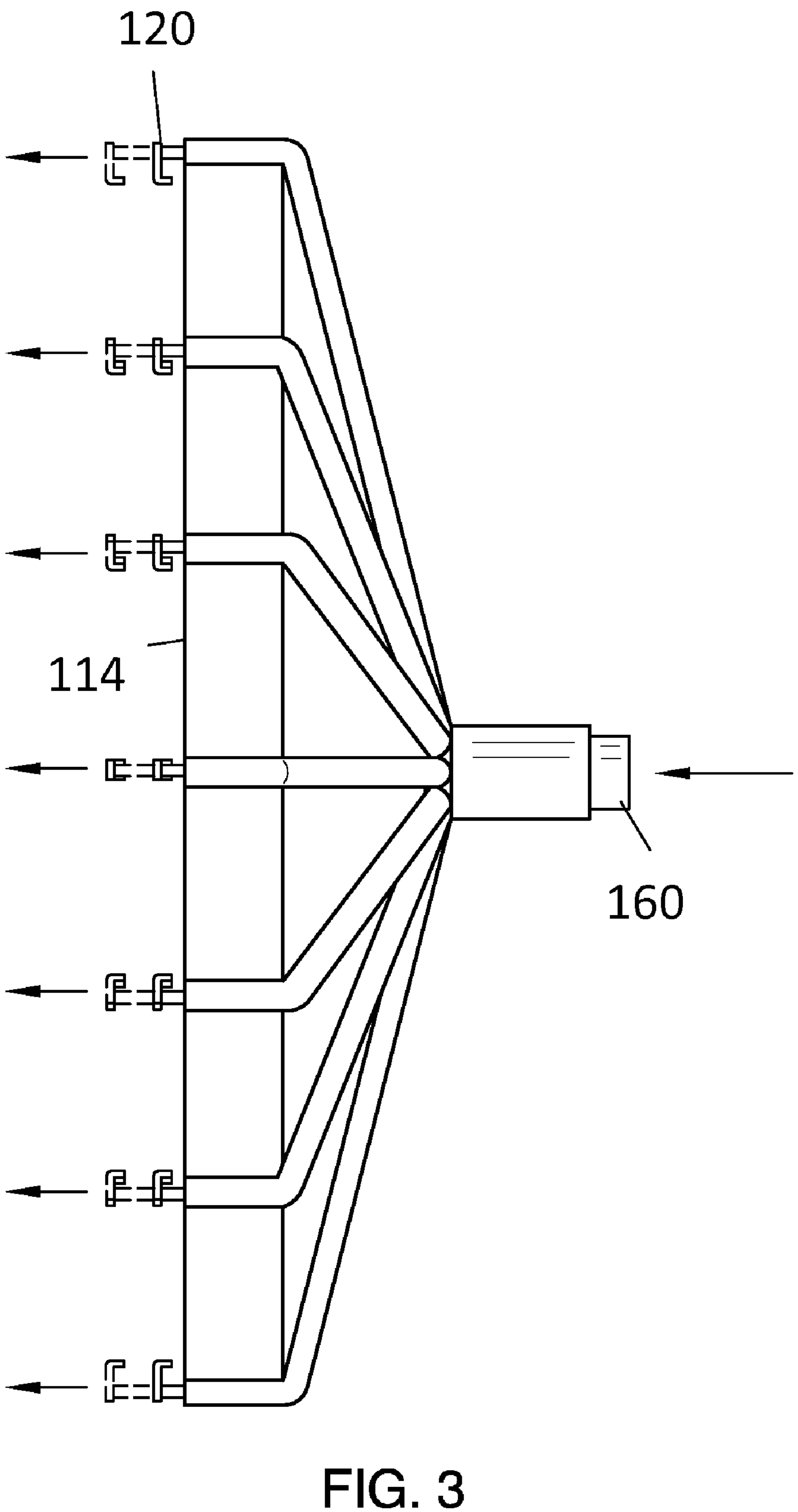
FIG. 3 is a side view of the rim shield device of FIG. 1.

Referring now to FIGS. 1-5, the present invention features a rim shield device 100 for covering and protecting a rim of a tire 101 while the tire 101 is sprayed with cleaning solution. The rim shield device 100 comprises a generally circular base 110 having an outer surface, an inner surface 111, and a raised side 114 along its outer edge. The raised side 114 forms an enclosure around the inner surface 111 (see FIG. 2). The base 110 may be constructed in a variety of sizes to accommodate various sizes of rims.

Figure 4:
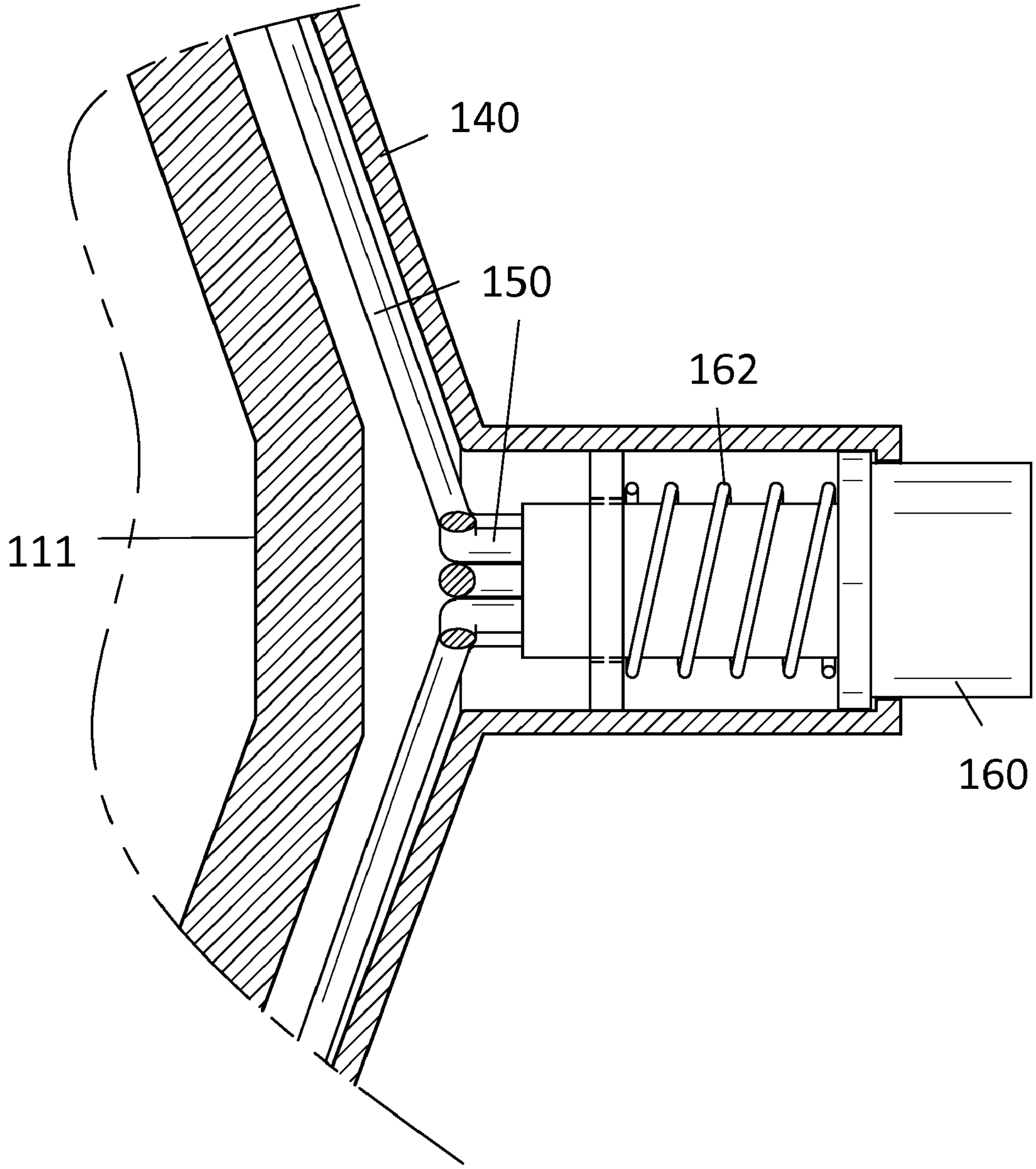
FIG. 4 is a side cross sectional view of the rim shield device of FIG. 1.
Figure 5:
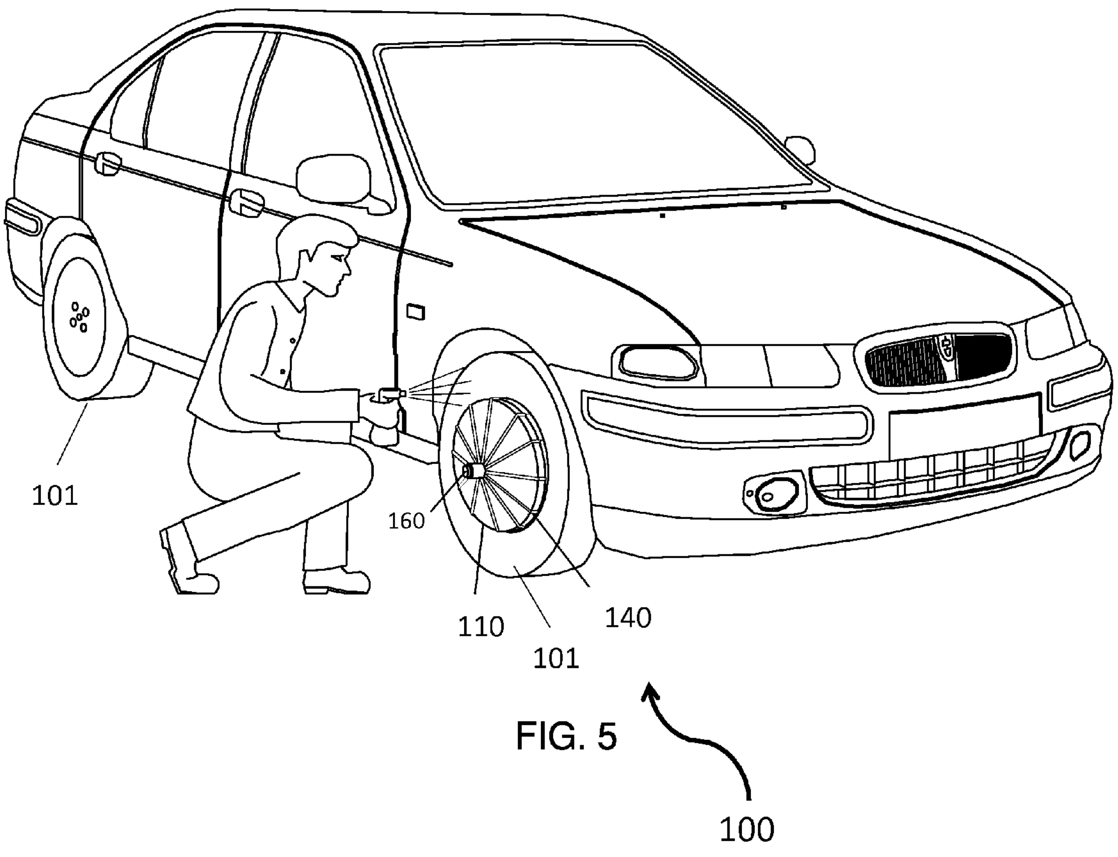
FIG. 5 is an in-use view of the rim shield device of the present invention.

Extending radially from the center of the base 110 is a plurality of cables 150, each cable 150 having a first end and a second end, the first end being positioned in the center of the base 110. The second ends of each of the cables 150 are positioned at or near the edge of the raised side 114 of the base 110. In some embodiments, each cable 150 is housed in a channel 140 disposed in the base 110 or on the base 110, for example on the outer surface as shown in FIG. 1 and FIG. 4. Disposed on the second ends of each cable 150 is a hook 120 (e.g., facing outwardly). The hooks 120 are adapted to hook onto the rim of the tire 101.

The first ends of the cables 150 are each engaged in a tightening system, which allows the cables to be loosened and tightened slightly for proper attachment and securing to the rim. For example, in some embodiments, the tightening system comprises a spring-loaded button 160 disposed in the center of the base 110. The spring-loaded button 160 can move between multiple positions including but not limited to an in position and an out position. An inner spring 162 of the spring-loaded button 160 biases the spring-loaded button 160 in the out position. The first ends of the cables 150 are engaged in the spring-loaded button 160, wherein when the spring-loaded button is in the out position the cables 150 are effectively shortened in length (the cables 150 are slightly retracted into the spring-loaded button 160) and when the spring-loaded button is in the in position the cables 150 are effectively lengthened (the cables 150 are slightly extended from the spring-loaded button 160). Thus, when a user wishes to attach the device 100 to the rim, the user moves the button 160 to the in position, effectively lengthening the cables 150 and allowing the hooks to be hooked around the rim. When the user is finished hooking the device 100 onto the rim, he/she can release the button 160, causing it to move back to the out position. In the out position, the cables 150 are effectively shortened, thus tightening the grip the shield device 100 has on the rim.

As shown in FIG. 1, in some embodiments, the device 100 of the present invention further comprises a removable cover 500 for covering the outer surface of the base. The removable cover 500 can be decorated with various designs and/or logos and/or advertisements (e.g., football teams, other sports teams, etc.) as desired. A center aperture is disposed in the center of the cover 500 adapted to allow passage of the spring-loaded button 160 (e.g., the cover may be generally flush with the base 110 with the spring-loaded button 160 protruding through the center aperture.

Without wishing to limit the present invention to any theory or mechanism, it is believed that the device 100 of the present invention is advantageous because the cables 150 (with hooks 120) that engage a spring-loaded button 160 help grip the device on the rim allowing for hands-free attachment and easy attachment/removal.

The disclosures of the following U.S. patents are incorporated in their entirety by reference herein: U.S. Pat. No. 7,448,694; U.S. Pat. No. 6,685,276; U.S. Pat. No. 6,905,177; U.S. Pat. No. 6,692,085; U.S. Pat. No. 5,524,972; U.S. Pat. No. 4,784,440; U.S. Pat. No. 5,423,599; U.S. Pat. No. 4,874,206.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A rim shield device for covering and protecting a rim of a tire, said rim shield device comprising:

(a) a generally circular base having an outer surface, an inner surface, and a raised side along its outer edge, the raised side forms an enclosure around the inner surface;

(b) a plurality of channels disposed on the base extending radially from the center of the base to or near the raised side of the base;

(c) a cable disposed in each channel extending radially from the center of the base, each cable has a first end and a second end, wherein the first end of each cable is positioned at the center of the base and the second end of each cable extends out of its respective channel, wherein a hook is disposed on the second end of each cable, the hooks are each adapted to hook onto the rim of a wheel; and (d) a tightening system comprising a spring-loaded button disposed in the center of the base, the first ends of each of the cables engage the spring-loaded button, the spring-loaded button movable between multiple positions including an in position and an out position, wherein an inner spring of the spring-loaded button biases the spring-loaded button in the out position, wherein when the spring-loaded button is in the out position the cables are effectively shortened in length as the cables are retracted into the spring-loaded button and when the spring-loaded button is in the in position the cables are effectively lengthened as the cables are extended from the spring-loaded button.

2. The rim shield device of claim 1 further comprising a removable cover for covering the outer surface of the base, the removable cover comprises a center aperture adapted to allow the spring-loaded button to protrude when the removable cover is mounted with the base.

* * * * *